United States Patent [19]

Fricker et al.

[11] 4,201,792
[45] May 6, 1980

[54] PRODUCTION OF SHERRY WINE

[75] Inventors: Richard Fricker, Derby; Robin W. Goswell, Bristol, both of England

[73] Assignee: A.G. (Patents) Limited, London, England

[21] Appl. No.: 845,848

[22] Filed: Oct. 27, 1977

[30] Foreign Application Priority Data

Oct. 28, 1976 [GB] United Kingdom ............... 44904/76

[51] Int. Cl.$^2$ ................................................ C12G 1/00
[52] U.S. Cl. ...................................... 426/15; 99/277; 99/277.1
[58] Field of Search .................... 426/15; 99/276, 277, 99/277.1

[56] References Cited

U.S. PATENT DOCUMENTS

| | | | |
|---|---|---|---|
| 210,863 | 12/1878 | Lansburgh | 99/277 X |
| 2,181,839 | 11/1939 | Tressler | 426/15 |
| 3,071,469 | 1/1963 | Krabbe et al. | 99/277.1 X |
| 3,207,606 | 9/1965 | Williams | 99/276 X |
| 3,734,746 | 5/1973 | Yasui et al. | 195/141 X |

FOREIGN PATENT DOCUMENTS 71589 7/1974 Australia .

OTHER PUBLICATIONS

Amerine, et al., The Technology of Wine Making, 3rd ed., The Avi Publ. Co., Inc., Westport, Conn. 1972 (pp. 415–418).

*Primary Examiner*—David M. Naff
*Attorney, Agent, or Firm*—Bacon & Thomas

[57] ABSTRACT

A process and apparatus for maturing sherry wine in which the multiplicity of casks conventionally used in the respective maturation stages are replaced by respective single containers, preferably sub-divisions of a single large vessel.

8 Claims, 4 Drawing Figures

PRODUCTION OF SHERRY WINE

This invention relates to a process and apparatus for maturing sherry wine, by which expression as used herein is included wine of "sherry-type".

The maturation of sherry wine is found to vary very significantly from cask to cask, even to the extent of producing wine of quite different character, and a system has been developed over the years, namely the so called solera system, which facilitates blending of the wine as it matures so as to yield a relatively uniform product.

In the traditional process of maturation by the solera system, after fermentation is substantially complete the wine is racked into casks and fortified with added alcohol. The solera system consists in maturing this wine in a number of distinct and separate stages, each one known as a "criadera" which contains a number of casks or butts. The wine progresses through these stages until it reaches the final period of development. Before any more is added to the youngest criadera, a proportion of the wine in the youngest criadera is drawn off and added to the next criadera and so on, so that this quantity of wine of various ages moves from criadera to criadera and to the final stage where it acquires the final maturity required for drinking. Each stage is hereinafter referred to as a scale and the final stage is referred to as the solera scale. The casks are not in fact filled with wine, and in some casks a film of yeast known as the "flor" develops at the wine/air interface while other casks from the same source will be quite free from flor. In general, sherries produced by the solera system with flor are termed fino sherries while those without flor are termed oloroso sherries.

In solera system as previously carried out, which facilitates production of a uniform wine from the variable initial product, the "solera scale" comprises a large number of separate butts or casks of wine, for example about 100 and typically each of about 500 liters capacity, each kept about 80% full in the case of fino sherry, in order to maintain a larger air/liquid interface, but somewhat fuller in the case of oloroso. At appropriate intervals, wine is drawn from all the butts in the solera scale to provide the wine for ultimate bottling but in order to preserve continuity of character only about one fifth of each butt is withdrawn. The butts in the solera scale are then filled to the original level with wine taken from a similar number of butts of wine in a criadera scale termed the "first criadera" which contains the oldest wine in the various criadera scales and these in turn are filled from a still further series of butts of a criadera scale containing the next oldest wine, termed the "second criadera". In the production of high quality fino sherries, there may be as many as twelve successive criadera scales through which the wine passed in turn; in general oloroso sherry only requires about six. The last or youngest criadera scale, e.g. the twelfth, is filled from butts of unblended wine all of the same year, usually about three years old and selected for its particular quality and character.

Thus, considering a moderate size system of six scales, each of 100 casks of 500 liters capacity, each time wine is drawn from the solera scale it is replaced with wine from the first criadera scale, which is itself replenished with wine from the second criadera scale, and so on. The fifth criadera scale is replenished with wine not previously incorporated in the system. In a typical cycle of operation, 100 liters of sherry may be withdrawn from each of the 100 casks in the solera. If this wine is not promptly replaced, the surface area/volume ratio in the cask will be altered and the character of the wine will change. Therefore, 100 liters of wine is withdrawn from each of the 100 casks in the first criadera scale, blended in a tank and then 100 liters is introduced into each of the solera scale casks, without disturbing the flor film if present. This procedure must be repeated in sequence throughout the scales of the system, so that in order to withdraw 10,000 liters of wine from such a system it is necessary to manipulate 600 casks of wine twice and to conduct six blending operations. Clearly this is a labour-intensive process involving skilled workmen of considerable experience.

Viewed from one aspect the present invention provides a process of maturing sherry wine using apparatus in which each criadera scale and the solera scale is constituted by a single respective container, in which process wine from the container representing the first criadera scale is transferred at intervals directly to the container representing the solera scale, and wine from each of the other criadera scales is transferred at similar intervals directly to the container representing the next criadera scale. By the expression "sherry wine" is included sherry-type wines.

Viewed from another aspect the invention provides apparatus for use in carrying out the process set forth above, comprising a plurality of containers each of such dimensions as respectively to be capable of containing the wine of each criadera scale and the solera scale, means for transferring wine at intervals directly from the first criadera scale container to the solera container, and means for transferring wine at similar intervals directly from each of the other criadera scale containers to the next criadera scale container.

In operation, wine is transferred from scale to scale as in the traditional solera system. The adjacent containers can be arranged to communicate by weirs, syphons or other means which will cause or permit wine to flow from one container into the next in the appropriate direction, i.e. along the sequence of criadera scales to the solera scale. It is important that the means permitting wine to flow in the required direction should not permit wine to flow back in the opposite direction.

Where the system is to operate as closely as possible to the traditional method, wine will be drawn first from the container representing the solera scale, for example about 20% of the volume of wine in the solera. Wine can then be caused or permitted to flow into the container representing the solera scale from the container representing the first criadera scale to replace the wine which has been withdrawn and the first criadera scale can in turn be replenished from the second criadera scale, the successive criadera scales being replenished in turn until the last is replenished with new wine. The wine can be arranged to flow through syphons entering the various containers well below the surface and if necessary provided with closures to prevent back mixing during the intervals between movements of the wine.

In a particularly preferred system, however, the solera and criadera scales are separated simply by weirs which permit wine to flow from one scale to the next whenever the level in one scale is raised by introduction of wine. In this system, the heights of the tops of the weirs would increase progressively from the solera to the last criadera in order to prevent back mixing.

Thus in a preferred form of the invention movement of the wine is effected by introducing new wine into the last criadera scale, for example about 20% of its volume, thereby causing the same volume of wine to flow into the next adjacent criadera scale, with consequent displacement of wine through successive criadera scale containers along to the solera scale container and from there into for instance the bottling system. It may be advantageous to provide a further container adjacent to the solera as a reservoir for wine which leaves the solera.

Naturally, the wine newly introduced into each scale mixes with that already there, so that the wine displaced from scale to scale towards the solera is progressively older.

Where the containers are sub-divisions of a single vessel the weirs between the containers need not extend across the whole wall dividing each scale from the next and, indeed, are preferably relatively narrow. In the maturation of fino sherry, the weirs should be arranged in such a way as to prevent overflow of the flor which is preferably kept as still as possible. The weirs can thus be situated behind baffles which extend down into the wine so that wine can only reach the weirs from a relatively low level beneath the surface. Such baffles are preferably arranged on the downstream sides of the weirs as well as the upstream sides in order to minimise disturbance of flor by the inflowing wine. In a preferred arrangement, a flat plate is attached diagonally across the junction between one end of each dividing wall and the adjacent side wall of the main vessel so as to form a conduit extending from a relatively low point in the container up to the atmosphere, a weir section being situated behind the plate and simply comprising a cutaway section of the dividing wall.

Preferably in each container the inlet and outlet are remote from one another. Thus the weirs between successive containers along a main vessel are preferably situated in opposite corners so as to maximise the flow path of the wine, and thus the mixing of newer wine with the older.

The whole apparatus may be provided with a top cover to protect the wine and assist in maintaining an even temperature. Observation hatches with loose covers may advantageously be provided in the top cover. The containers may be sealable to enable the atmosphere therein to be filtered or otherwise treated.

It will be appreciated that the process and apparatus according to the invention reduces very greatly the labour element in moving wine through the solera system. This enables sherries of fino quality to be produced significantly more cheaply than hitherto. In particular, the production of amontillado sherry, which requires movement through a first solera scale in contact with flor and then through a second solera scale without flor, is very greatly facilitated.

An embodiment of the invention will now be described by way of example and with reference to the accompanying diagrammatic drawings in which.

Figure 1:
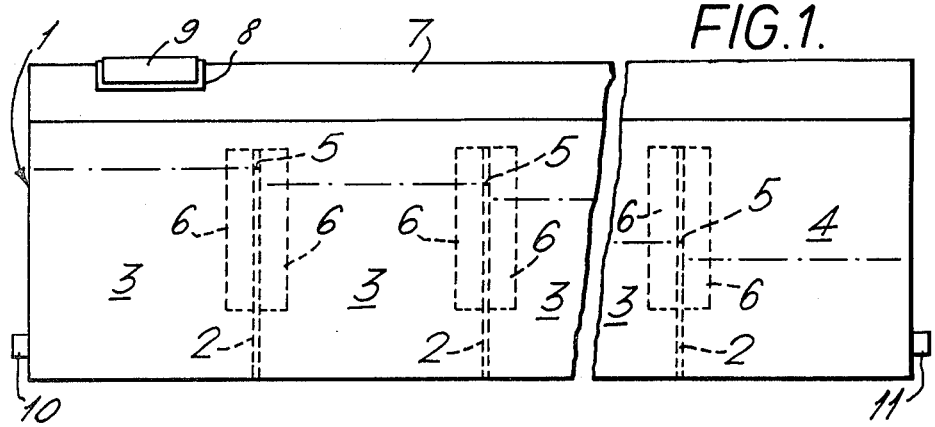
FIG. 1 is a side elevation, partly broken away, of a single vessel solera system according to the invention.
Figure 2:
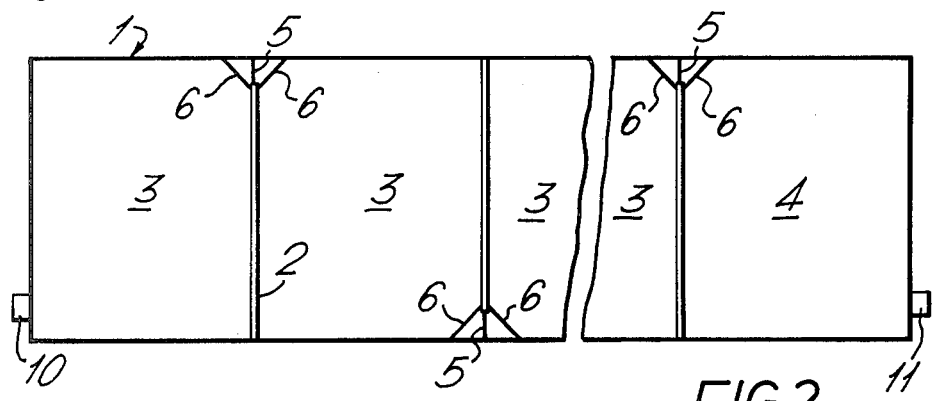
FIG. 2 is a horizontal view of the apparatus shown in FIG. 1, with its top cover removed to show the interior.
Figure 3:
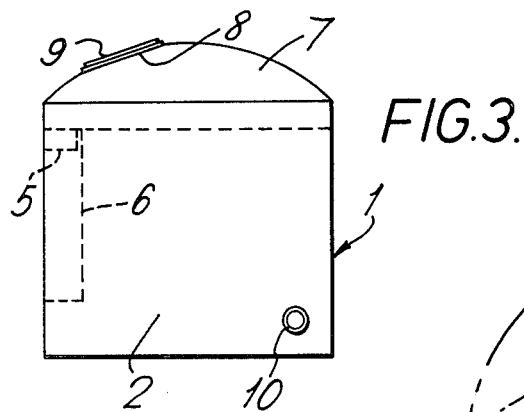
FIG. 3 is an end view of the apparatus.
Figure 4:
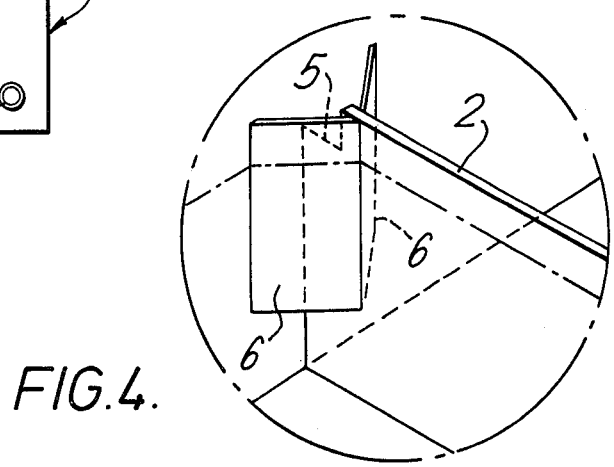
FIG. 4 is a perspective view of a weir in the apparatus.

Referring to the drawings, a vessel 1 is provided with dividing walls 2, which create a series of separate containers 3 and 4 within the vessel, the containers 3 being and comprising the respective criadera scales and the container 4 for, in this embodiment, a single solera scale. The leftmost container 3 in FIG. 1 is the youngest criadera scale, and the solera container 4 is the oldest scale, each scale in between being progressively older as they approach the solera. Each wall 2 is provided with a cut away portion 5, see particularly FIG. 4, which constitutes a liquid transfer means in the form of a weir permitting flow of liquid from one container to the next. Angled baffle plates 6 are provided on the upstream and downstream sides of the weirs to avoid disturbance of flor on the surface of the wine. The vessel 1 is provided with a top cover 7 which possesses at least one observation hatch 8 with a closure 9. An inlet 10 is provided for feeding new wine into the last, i.e. most upstream, or youngest criadera scale container 3 at a level below the surface of the wine so as not to disturb the flor, whilst an outlet 11 is provided in the solera scale container 4, again at level below the wine surface. It will be noted that the inlet to and outlet from each of the containers 3 and 4 are positioned as remotely as possible from each other so as to minimise the possiblity of any wine flowing directly through a container during a transfer cycle.

The apparatus is arranged so that, in operation, the ratio of surface area to volume of the wine in each scale is substantially the same as that in each of the casks of the traditional solera system, i.e. of the order of 1 cm$^2$ of surface area per 60 cm$^3$ of volume.

The manner of operation of the apparatus will be clear from the preceding description. When a quantity of new wine is added to the last criadera scale 3 via inlet 10, overflow of a similar quantity of wine occurs over each of the weirs 5 and the same quantity may then be withdrawn from the solera scale 4 via outlet 11. The weirs 5 are of course at progressively lower levels so as to prevent any back flow.

The advantages and disadvantages of the traditional solera system and the manner in which they may be respectively maintained and at least reduced by the system of the invention at least in its preferred form will now be summarised. The advantages claimed for the traditional process are:

1. There is a complete blending system, i.e. all the wine withdrawn from each scale of the system is blended together and the same percentage of this blended wine is introduced into every cask of the next scale.
2. The wine is constantly exposed to the action of the flor, when present, in a situation where the ratio of the area of the flor film to the volume of wine is such as has been found optimum in practice.
3. The wine is consistently subject to the low redox potential existing under the flor film and at no time is it exposed to the direct action of atmospheric oxidation.
4. The process is truly serial, e.g. when wine from the fifth criadera scale is introduced into the fourth criadera scale, there is no possibility that any part of the wine will find its way simultaneously into the third criadera scale.
5. The movement of the wine through the system ensures that nutrients are supplied in adequate amounts to the yeasts comprising the flor, when present. If an attempt is made to age wine under flor in a single container the flor yeasts seem to exhaust certain essential nutrients and the yeasts become inactive. Consequently it is not possible to achieve more than a short period of maturation under reducing conditions without the use of the traditional process.

On the other hand, the limitations of the traditional system are:

A. Its operation requires a great deal of attention from highly skilled workers.

B. It takes a large amount of warehouse space to contain a comparatively small volume of wine.

C. The temperature of the wine can only be controlled by controlling the ambient temperature in the warehouse, which is frequently expensive and incovenient.

D. The nature of the gaseous phase within the casks cannot be controlled, either with respect to humidity or oxygen content, both of which have a significant effect upon the progress of the process.

E. It is not possible to achieve a proper sterilisation of the wooden casks so that the use of pure cultures is difficult and perhaps impossible.

F. It is not possible to control the type and quality of materials which may be extracted from the surface of the wooden casks, and some of the material extracted may be undesirable for certain types of wine.

G. Individual casks are always subject to unexpected leakage.

Turning now to the preferred form of apparatus of the invention, this maintains the advantages of the traditional system in that there is a complete blending system, as all the wine in each scale is blended together and when a transfer is made all the wine transferred is blended with all the wine in the next scale. Therefore it achieves the advantage listed for the traditional system under item 1.

The apparatus is so constructed that the ratio of the surface area of the wine to its volume is similar to that in a traditional system and is optimal for this process. Therefore it achieves the advantage listed for the traditional system under item 2.

The wine in the apparatus is continuously subject to the protection of the flor except during the actual process of transfer over the weirs. Practical experience shows that the aeration which takes place during this movement over the weirs is negligible and not significant in the maturation of the wine, being similar to that which occurs during normal transfers using a traditional solera system. Therefore it achieves the advantage listed for the traditional system under item 3.

A true fractional blending system can be achieved by ensuring that wine is added slowly to the last criadera scale of the apparatus at a rate which experiments suggest should be less than one-quarter of the capacity of that stage per hour. Therefore true fractional blending can be achieved and the system thereby achieves the advantage listed for the traditional system under item 4.

The movement of the wine through the apparatus ensures that nutrients are supplied in adequate amounts to the yeasts comprising the flor, when present. Therefore it achieves the advantage listed for the traditional system under item 5.

The apparatus requires much less labour than that of the traditional system. Therefore it overcomes the disadvantage listed as item A.

The apparatus takes much less warehouse space than the traditional system when maturing a similar amount of wire. Therefore it overcomes the disadvantage listed as item B.

The temperature of the wine can readily be controlled thereby overcoming the disadvantage of the traditional system listed as item C.

The nature of the gaseous phase within the system can be controlled and, if necessary, it can be sterile filtered. Therefore the apparatus overcomes the disadvantage of the traditional system listed as item D.

It is possible to achieve a proper sterilisation of the apparatus. Therefore sterile cultures can be used giving a full microbiological control over the process. Therefore it overcomes the disadvantage of the traditional process listed as item E.

The apparatus can be made of material which is inert to wine, such as stainless steel, thereby giving full control over any materials which may be extracted into the wine during the maturation process. Therefore it overcomes the disadvantage listed as item F.

The apparatus can be constructed in ways so that leaks should not occur. Therefore it overcomes the disadvantage listed as item G.

As well as being used in place of a traditional solera system the apparatus of the invention may also be used to condition young wines immediately after the alcoholic fermentation to ensure that they are of uniform quality and suitable for feeding into a traditional solera system. It may also be used with considerable advantage to receive wines which have already received a traditional maturation under flor, but which require a further period of processing or blending with other similar wines from other sources, so that the quality of the wine does not suffer during further blending and processing operations.

What we claim is:

1. A process for maturing sherry wine comprising
   (a) establishing a solera scale and one or more progressively younger criadera scales, each scale comprising an individual container filled to a predetermined level with process wine, the containers being separated by partitions having weirs therein set at progressively lower levels from the youngest to the oldest scale to enable forward gravitational flow of process wine between the scales from the youngest to the oldest over the weirs, with each weir being baffled against access thereto by the flor in each scale on opposite sides of the respective weir;
   (b) periodically transferring a quantity of process wine from a criadera scale to an older scale while directly and simultaneously transferring to each successive older criadera scale, if there be one, but at least to the solera scale, a similar quantity of process wine from the next youngest scale by overflow over the weirs, by causing the wine in each scale involved in the transfer to flow over the weir from a liquid level beneath the flor in the upstream scale and to flow into the downstream scale beneath the flor in the latter.

2. The process according to claim 1, wherein during the step of transferring the wine, the wine transferred from each scale is discharged from an area within each container comprising the respective scale that is remote from that area of the same container whereat the younger wine is admitted.

3. The process according to claim 1, wherein the transfer of process wine is carried out while the wines in each scale are exposed to a common atmosphere.

4. The process according to claim 1, wherein the step of transferring wine is carried out without substantially altering the final level of wine in any of the scales involved in the transfer, nor substantially changing the level of wine in each scale during each transfer.

5. Apparatus for carrying out maturing of sherry wine comprising
   a plurality of containers for scales of maturing sherry wine, each scale normally having flor floating on its surface, said liquid containers comprising separate compartments within a single vessel, said compartments being defined by serially spaced partitions extending between sidewalls of the vessel and only partially between top and bottom walls of the vessel;
   weir means comprising cutouts in said partitions, each weir from the youngest to the oldest scale being set at a progressively lower level to enable liquid flow between containers from the younger to the older scale; and
   baffle means in each respective container located on either side of each weir, each baffle having a lower edge located below the normal minimum liquid level in its respective container and an upper edge located above the normal maximum level of liquid in its respective container, each baffle shielding all but a small portion of the flor in the respective containers from direct access to liquid overflowing the weir.

6. Apparatus according to claim 5, each of said cutouts being disposed at an opposite end of each successive partition.

7. Apparatus according to claim 5, including a single inlet for new wine at one end of the vessel in communication with the youngest scale and an outlet for matured wine in communication with the oldest scale
   said inlet and outlet communicating with each respective container at a level below the surface level of wine normally present in each container.

8. Apparatus according to claim 5, said vessel having an observation opening and a sealable closure for the opening above the liquid levels in the vessel.

* * * * *